United States Patent
Xu et al.

(10) Patent No.: US 12,403,736 B2
(45) Date of Patent: Sep. 2, 2025

(54) AXLE STRUCTURE AND VEHICLE

(71) Applicant: SHENZHEN MAMMOTION INNOVATION CO., LIMITED, Guangdong (CN)

(72) Inventors: Yuanjun Xu, Guangdong (CN); Shaojie Chen, Guangdong (CN); Ben Wang, Guangdong (CN)

(73) Assignee: SHENZHEN MAMMOTION INNOVATION CO., LIMITED, Shenzhen (CN)

( * ) Notice: Subject to any disclaimer, the term of this patent is extended or adjusted under 35 U.S.C. 154(b) by 0 days.

(21) Appl. No.: 19/033,203

(22) Filed: Jan. 21, 2025

(65) Prior Publication Data

US 2025/0162366 A1  May 22, 2025

Related U.S. Application Data

(63) Continuation of application No. PCT/CN2023/079054, filed on Mar. 1, 2023.

(30) Foreign Application Priority Data

Aug. 1, 2022 (CN) .......................... 202222015265.1

(51) Int. Cl.
  *B60G 9/02* (2006.01)
(52) U.S. Cl.
  CPC ...................................... *B60G 9/02* (2013.01)
(58) Field of Classification Search
  CPC ........... B60G 9/02; B60G 9/022; B60G 9/025
  See application file for complete search history.

(56) References Cited

U.S. PATENT DOCUMENTS

| | | | | |
|---|---|---|---|---|
| 4,750,751 A | * | 6/1988 | Schafer | A01D 75/285 180/41 |
| 5,946,893 A | * | 9/1999 | Gordon | A01D 34/74 56/15.8 |
| 6,695,328 B2 | * | 2/2004 | Cope | B62D 53/026 280/124.111 |

(Continued)

FOREIGN PATENT DOCUMENTS

| CN | 2787486 Y | 6/2006 |
|---|---|---|
| CN | 202945032 U | 5/2013 |

(Continued)

OTHER PUBLICATIONS

International Search Report and Written Opinion in International Application No. PCT/CN2023/079054, issued on Jun. 13, 2023 with English translation provided by WIPO.

*Primary Examiner* — Toan C To
(74) *Attorney, Agent, or Firm* — Ladas & Parry, LLP

(57) ABSTRACT

The present application relates to an axle structure and a vehicle. The vehicle includes a chassis, and the axle structure is arranged on the chassis. The axle structure includes a pedestal, a pivot shaft, an axle and limiting structures. The pivot shaft is fixed to the pedestal. The middle of the axle is rotatably connected to the pivot shaft, so that two ends of the axle can rotate vertically relative to the pedestal. In the axle structure provided in the present disclosure, the pivot shaft is provided on the pedestal, and the axle is rotatably connected to the pivot shaft.

20 Claims, 6 Drawing Sheets

(56) References Cited

U.S. PATENT DOCUMENTS

| | | | | |
|---|---|---|---|---|
| 7,309,081 | B1 * | 12/2007 | Zuhlsdorf | B62K 5/01 280/6.154 |
| 7,866,671 | B2 * | 1/2011 | Madler | A01D 34/66 180/41 |
| 8,205,899 | B2 * | 6/2012 | Mackin | A01D 41/12 180/209 |
| 10,836,227 | B2 * | 11/2020 | Dyna | B62D 7/04 |
| 11,470,773 | B2 * | 10/2022 | Wenzel | A01D 34/74 |
| 2004/0262070 | A1 * | 12/2004 | Uemura | B60B 35/003 180/378 |
| 2009/0103842 | A1 * | 4/2009 | Vannorsdel | F16C 11/04 384/151 |
| 2020/0262266 | A1 * | 8/2020 | Weiss | B60G 9/02 |

FOREIGN PATENT DOCUMENTS

| | | |
|---|---|---|
| CN | 217936537 U | 12/2022 |
| JP | 2004243912 A | 9/2004 |

* cited by examiner

US 12,403,736 B2

AXLE STRUCTURE AND VEHICLE

CROSS-REFERENCE TO RELATED APPLICATIONS

The present application is a continuation of International Application No. PCT/CN2023/079054, filed on Mar. 1, 2023, which claims priority to Chinese Patent Application No. CN202222015265.1, filed with the China National Intellectual Property Administration on Mar. 1, 2022 and entitled "Axle structure and vehicle", the disclosures of which are incorporated herein by reference in their entireties.

TECHNICAL FIELD

The present disclosure relates to the technical field of vehicles, and in particular to an axle structure and a vehicle.

BACKGROUND ART

When driving over uneven ground, existing vehicles tend to experience jolting vibrations, resulting in poor driving stability of the vehicles.

SUMMARY OF THE INVENTION

The present disclosure provides an axle structure and a vehicle to solve the problem of poor driving stability in existing vehicle.

In a first aspect, the present disclosure provides an axle structure. The axle structure includes a pedestal, a pivot shaft, an axle and limiting structures. The pivot shaft is fixed to the pedestal. The middle of the axle is rotatably connected to the pivot shaft, so that two ends of the axle can rotate vertically relative to the pedestal. The pivot shaft includes an intermediate section and connecting sections connected to two ends of the intermediate section, a diameter of the intermediate section is greater than that of the connecting section, and the middle of the axle is rotatably connected to the intermediate section.

In a second aspect, the present disclosure provides a vehicle. The vehicle includes a chassis and the axle structure, and the axle structure is arranged on the chassis.

In the axle structure provided in the present disclosure, the pivot shaft is provided on the pedestal, and the axle is rotatably connected to the pivot shaft, so that when the vehicle drives over uneven ground, the axle can rotate vertically relative to the pedestal, so as to counteract the impact of the uneven ground on the pedestal, thereby improving the driving stability of the vehicle.

BRIEF DESCRIPTION OF THE DRAWINGS

To describe the technical solutions in the embodiments of the present disclosure more clearly, the drawings required for illustration of the embodiments of the present disclosure will be briefly introduced below. Obviously, the drawings in the following description are only for some of the embodiments of the present disclosure, and for those of ordinary skill in the art, other drawings can also be obtained from these drawings without any creative effort.

Figure 1:
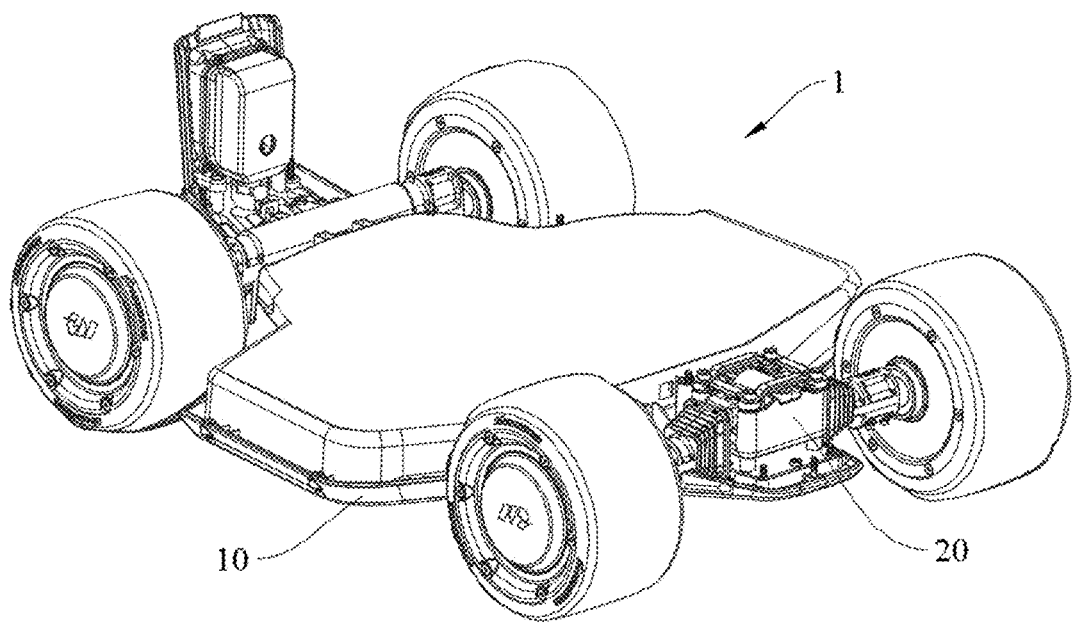
FIG. 1 is a partial schematic structural diagram of a vehicle according to an embodiment of the present disclosure.

Description of reference signs of main elements: Vehicle 1; Chassis 10; Axle structure 20; Pedestal 100; Bottom plate 110; Side plate 120; Limiting structure 130; Chamfer structure 111; Stopper 121; Mounting groove 122; Pivot shaft 200; Intermediate section 210; Connecting section 220; Stop plate 230; Fastener 240; Axle 300; Abutment surface 301; First subsection 310; Reinforcing structure 311; Connection hole 312; Second subsection 320; Flat section 321; Bent section 322; Accommodating cavity 330; Base 400; Guide post 410; Buffer member 420; Cable 500.

The following specific implementations will further illustrate the present disclosure in conjunction with the aforementioned accompanying drawings.

DETAILED DESCRIPTION OF EMBODIMENTS

The technical solutions in the embodiments of the present disclosure will be clearly and completely described below in conjunction with the accompanying drawings in the embodiments of the present disclosure. The drawings are used for exemplary illustration only, are merely schematic diagrams, and should not be construed as limitations to this disclosure. Obviously, the described embodiments are only a part rather than all of the embodiments of the present disclosure. All other embodiments obtained by a person of ordinary skill in the art based on the embodiments of the present disclosure without creative efforts shall fall within the protection scope of the present disclosure.

The phrase "embodiment" or "embodiments" mentioned herein means that the specific features, structures or characteristics described with reference to the embodiment or embodiments may be included in at least one embodiment of the present disclosure. This phrase in various places in the specification does not necessarily refer to the same embodiment or an independent or alternative embodiment exclusive of other embodiments. It should be appreciated explicitly or implicitly by those skilled in the art that the embodiments described herein can be combined with other embodiments.

It should be noted that the terms "first", "second" and so on in the specification, the claims and the drawings of the present disclosure are intended to distinguish different objects, rather than to describe a specific order. In addition, the terms "comprise" and "have" and any variations thereof are intended to cover a non-exclusive inclusion.

Figure 2:
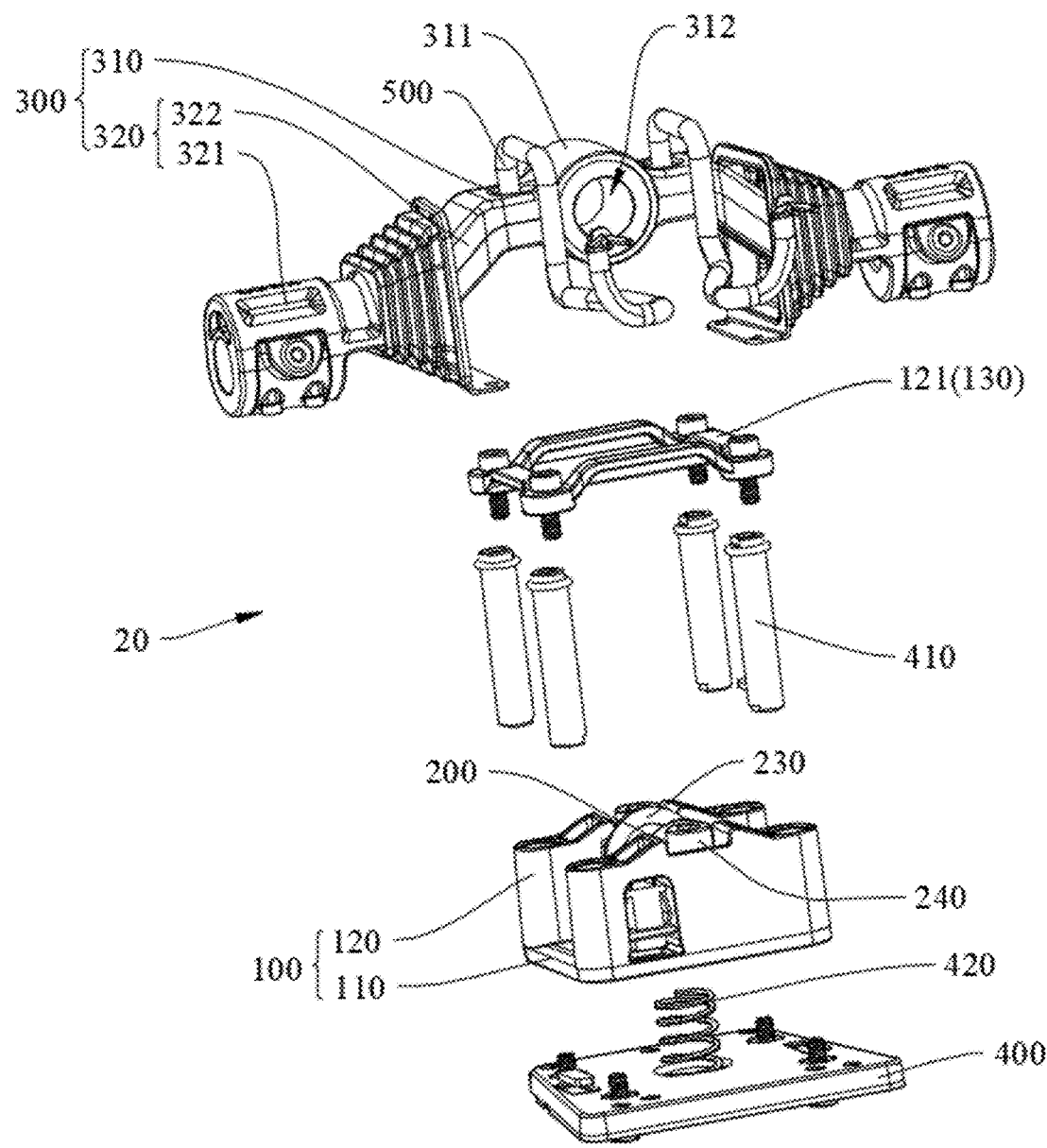
FIG. 2 is an exploded view of an axle structure on the vehicle in FIG. 1.

Referring to FIGS. 1 and 2, an embodiment of the present disclosure provides a schematic structural diagram of a vehicle 1. The vehicle 1 includes a chassis 10 and an axle structure 20 arranged on the chassis 10. Wheels are respectively connected to two ends of the axle structure 20. The axle structure 20 includes a pedestal 100, a pivot shaft 200 and an axle 300. The pedestal 100 is connected to the chassis 10. The pivot shaft 200 is fixed to the pedestal 100. The middle of the axle 300 is rotatably connected to the pivot shaft 200, so that two ends of the axle 300 can rotate vertically relative to the pedestal 100. The vertical rotation refers to the relative movement of the two ends of the axle 300 close to or away from the ground when the vehicle 1 is normally placed on the ground. Alternatively, it refers to the axle 300 rotating in a plane perpendicular to both the ground and a central axis of the pivot shaft 200, with the central axis of the pivot shaft 200 as a rotation center.

It can be understood that the ground is not entirely a flat plane and typically has depressions or protrusions, and the vehicle 1 cannot completely avoid the depressions or the protrusions on the ground while driving. In an existing vehicle, an axle is relatively fixedly connected to a chassis, and the axle cannot rotate relative to the chassis; therefore, when the vehicle drives over a depression or a protrusion, the axle will drive the chassis to tilt from side to side along with the fluctuation of the ground, leading to jolting vibrations of a vehicle body of the vehicle, thereby resulting in poor driving stability of the vehicle. In this embodiment, when the vehicle 1 drives over uneven ground, the axle 300 can rotate relative to the pedestal 100 adaptively according to the fluctuation of the ground, so that the chassis 10 of the vehicle 1 is always maintained in a state parallel to the ground, thereby greatly reducing jolting vibrations of the vehicle 1 during driving, and further improving the driving stability of the vehicle.

Figure 3:
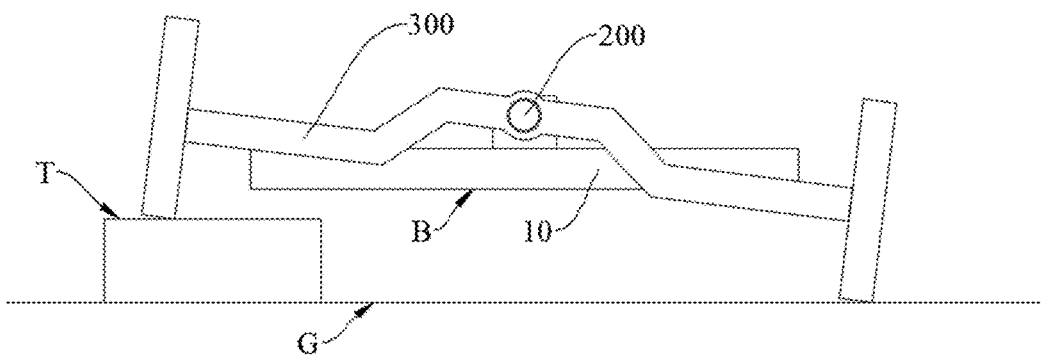
FIG. 3 is a schematic diagram of a vehicle in a first driving state according to an embodiment of the present disclosure.

Referring to FIG. 3, in FIG. 3, the reference sign G represents the ground, the reference sign T represents a top surface of a protrusion on the ground, and the reference sign B represents a bottom surface of the chassis 10. The top surface of the protrusion may be a surface of the protrusion away from the ground, and the bottom surface B of the chassis 10 refers to a surface of the chassis 10 facing the ground. In FIG. 3, a right wheel of the vehicle 1 is located on the ground, and a left wheel is located on a protrusion. When the vehicle 1 drives over the protrusion, the axle 300 rotates relative to the pivot shaft 200, allowing the chassis 10 to remain approximately parallel to the ground. In this way, when the vehicle 1 drives over the protrusion, the vehicle body of the vehicle 1 does not vibrate greatly, and thus the vehicle 1 can smoothly drive over the protrusion.

Figure 4:
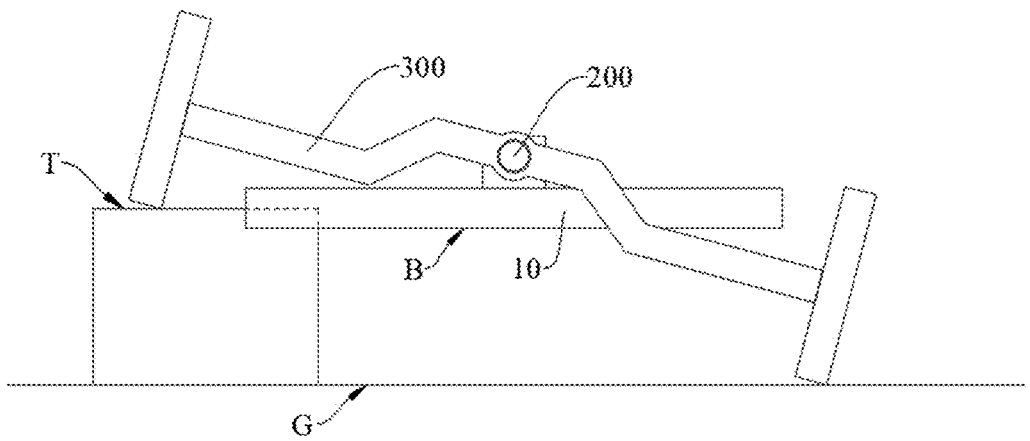
FIG. 4 is a schematic diagram of a vehicle in a second driving state according to an embodiment of the present disclosure.

In FIG. 3, when the height of the protrusion on the ground is relatively low, a ground clearance of the bottom surface B of the chassis 10 is greater than that of the top surface T of the protrusion when the vehicle 1 drives over the protrusion, and at this time, the chassis 10 will not collide with the protrusion. Referring to FIG. 4, when the height of the protrusion on the ground is relatively high, the ground clearance of the bottom surface B of the chassis 10 is less than that of the top surface T of the protrusion when the vehicle 1 drives over the protrusion, and at this time, the chassis 10 will collide with the protrusion (as indicated by a dashed line in FIG. 4). Therefore, when an angle at which the axle 300 can rotate relative to the pivot shaft 200 is too large, the chassis 10 is likely to collide with a higher protrusion on the ground when the vehicle 1 drives over the high protrusion.

Figure 5:
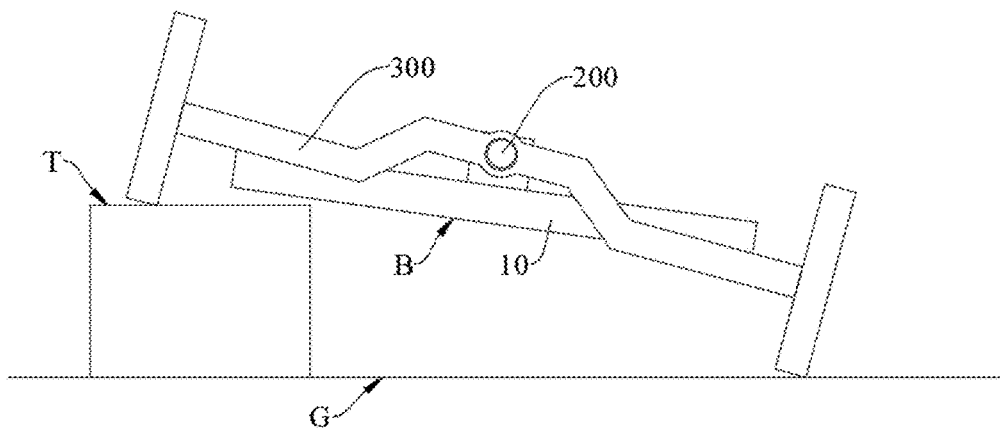
FIG. 5 is a schematic diagram of a vehicle in a third driving state according to an embodiment of the present disclosure.

In this embodiment, limiting structures 130 are provided on the pedestal 100, and the limiting structures 130 are configured to limit a rotating angle of the axle 300 relative to the pivot shaft 200, so that the rotating angle of the axle 300 relative to the pivot shaft 200 is limited within a preset angle, thereby preventing the chassis 10 from colliding with obstacles when the vehicle 1 traverses the obstacles. Referring to FIG. 5, when the vehicle 1 crosses a higher protrusion on the ground, after the axle 300 rotates by the preset angle relative to the chassis 10, if the axle 300 continues to rotate relative to the ground, the axle 300 will drive the chassis 10 to rotate, so that the chassis 10 tilts relative to the ground. At this time, the side of the chassis 10 close to the protrusion will be lifted, and a ground clearance of a left side of the bottom surface B will be greater than that of the top surface T of the protrusion, so that the vehicle 1 can smoothly drive over the protrusion. In this way, in this embodiment, by providing the limiting structures 130 on the pedestal 100, the obstacle-traversing ability of the vehicle 1 can be improved, and when the height of the obstacles is less than a preset value, the vehicle 1 has good driving stability. The preset angle is related to the ground clearance of the bottom surface B and the height of the protrusion that the vehicle 1 requires to drive over, and a specific range of the preset angle may be specifically set according to actual needs of the vehicle 1, which is not specifically limited in the present disclosure.

Figure 6:
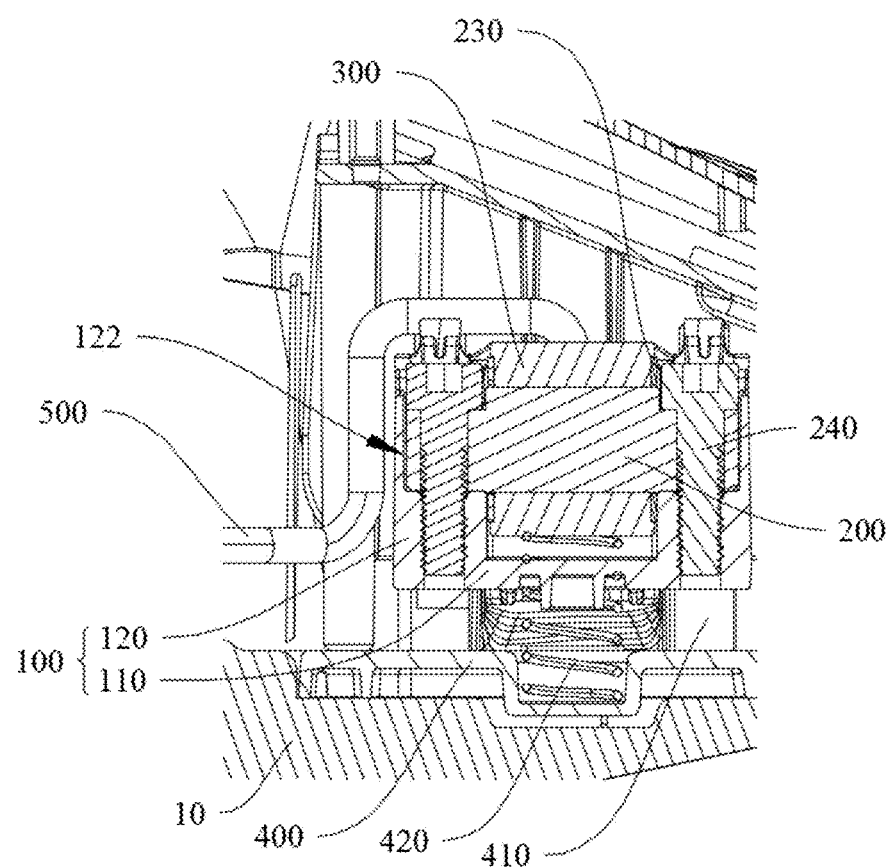
FIG. 6 is a cross-sectional view of an axle structure on the vehicle in FIG. 1 from a first perspective.

Referring to FIGS. 2 and 6, the pedestal 100 includes a bottom plate 110 and side plates 120 connected to the bottom plate 110. Two side plates 120 are provided, and the two side plates 120 are arranged opposite each other. In this embodiment, the limiting structures 130 are configured as chamfer structures 111 arranged on the pedestal 100. The axle 300 is provided with abutment surfaces 301 mating with the chamfer structures 111. Specifically, the chamfer structures 111 are provided on the bottom plate 110 and positioned between the two side plates 120. The bottom plate 110 is substantially of a rectangular structure, the two side plates 120 are disposed on two opposite sides of the bottom plate 110, and the chamfer structures 111 are disposed on the other two opposite sides of the bottom plate 110. When the axle 300 rotates relative to the chassis 10 by the preset angle, the abutment surfaces 301 abut against the chamfer structures 111, and the axle 300 cannot continue to rotate relative to the pivot shaft 200. If the axle 300 continues to rotate relative to the ground, the axle 300 will drive the chassis 10 to rotate relative to the ground, and at this moment, the bottom surface B of the chassis 10 will tilt relative to the ground.

In some embodiments, a stopper 121 is arranged at one end of the side plate 120 away from the bottom plate 110, and the limiting structure 130 is configured as the stopper 121. The pivot shaft 200 is provided between the stoppers 121 and the bottom plate 110. A limiting space is formed between the stoppers 121 and the bottom plate 110, and the axle 300 can rotate in the limiting space. When the axle 300 rotates relative to the chassis 10 by the preset angle, the axle 300 abuts against the stoppers 121. As the axle 300 continues to rotate, the axle 300 will drive the chassis 10 to tilt relative to the ground.

In this embodiment, two ends of the pivot shaft 200 are fixedly connected to the two side plates 120 respectively, and the pivot shaft 200 is positioned between the two side plates 120. The bottom plate 110 and the two side plates 120 jointly enclose an accommodating space, and the pivot shaft 200 is provided in the accommodating space. The pivot shaft 200 is spaced from the bottom plate 110 to provide a space for the axle 300 to move. The pivot shaft 200 and the side plates 120 may be fixedly connected by screwing, clamping, welding, bonding, etc. In this embodiment, ends of the two side plates 120 facing away from the bottom plate 110 are respectively provided with mounting grooves 122, and the two ends of the pivot shaft 200 are respectively disposed in the mounting grooves 122 of the two side plates 120. Specifically, the mounting grooves 122 are provided on opposite sides of the two side plates 120 and do not penetrate opposing sides of the two side plates 120. When the pivot shaft 200 is mounted in the mounting grooves 122, the two ends of the pivot shaft 200 do not extend out of the side plates 120 to prevent structural interference between the ends of the pivot shaft 200 and other elements on the vehicle 1. The pivot shaft 200 is connected to the side plates 120 via fasteners 240. The fasteners 240 may be configured as pins, bolts, rivets, etc. In this embodiment, the fasteners 240 are configured as bolts, the number of which is set to two. A threaded hole is formed in a groove wall of a side of the mounting groove 122 close to the bottom plate 110, through holes are respectively formed at the two ends of the pivot shaft 200, and the two bolts are respectively threaded through the through holes on the two ends of the pivot shaft 200 and are then connected to the threaded holes on the groove walls, thereby fixing the pivot shaft 200 in the mounting grooves 122 on the two side plates 120. Thus, the two ends of the pivot shaft 200 are fixed by the fasteners 240, and if a fastener 240 at one end of the pivot shaft 200 is loosened, the fastener 240 at the other end can still fix the pivot shaft 200 on the side plates 120, thereby preventing the pivot shaft 200 from loosening.

Figure 7:
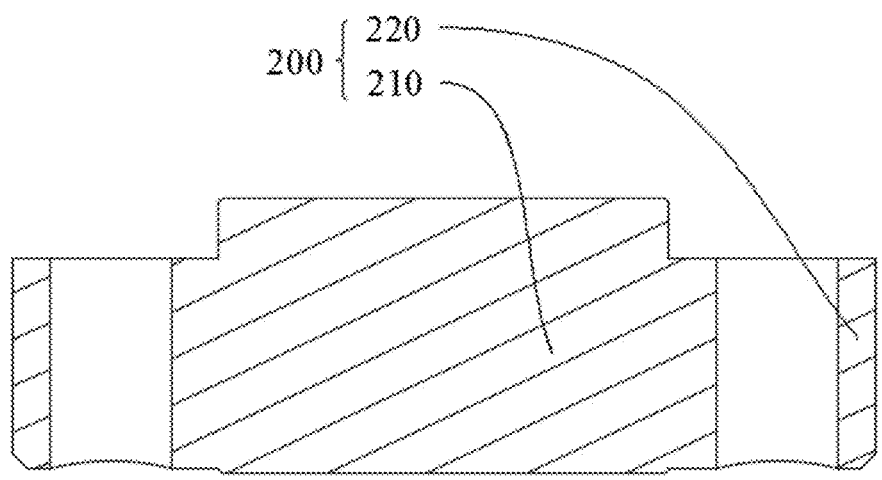
FIG. 7 is a cross-sectional view of a pivot shaft on the axle structure in FIG. 6.

It can be understood that, after the vehicle 1 has been used for a long time, due to continuous friction between the axle 300 and the pivot shaft 200, a position on the pivot shaft 200 corresponding to the axle 300 will be worn, resulting in a decrease in the structural strength of the pivot shaft 200 at that position, thereby making the pivot shaft prone to breakage at that position. Referring to FIGS. 6 and 7, in this embodiment, the pivot shaft 200 includes an intermediate section 210 and connecting sections 220 connected to two ends of the intermediate section 210, a diameter of the intermediate section 210 being greater than that of the connecting section 220. The middle of the axle 300 is rotatably connected to the intermediate section 210. In this embodiment, by increasing the diameter of the intermediate section 210, the intermediate section 210 still maintains sufficient structural strength after prolonged wear, thereby prolonging the service life of the pivot shaft 200. A difference between the diameter of the intermediate section 210 and the diameter of the connecting section 220 may be a preset value, and the preset value may be specifically set according to the selection of materials of the pivot shaft 200 and the axle 300 and the service life of the pivot shaft 200. For example, the diameter of the intermediate section 210 can be set larger when a longer service life is required for the pivot shaft 200. The diameter of the connecting section 220 being less than that of the intermediate section 210 can also reduce the difficulty in installing the axle 300 and the pivot shaft 200. When installing the axle 300, since the diameter of the connecting section 220 is relatively small, technicians can easily sleeve the axle 300 onto the connecting sections 220 and pre-position the axle 300 through the connecting sections 220, thereby facilitating the technicians to sleeve the axle 300 onto the intermediate section 210 in a next step.

In some embodiments, the pivot shaft 200 may be configured as an eccentric shaft, where the intermediate section 210 is eccentrically disposed from the connecting sections 220. After the pivot shaft 200 is fixed to the pedestal 100, a central axis of the intermediate section 210 is located on a side of a central axis of the connecting section 220 away from the bottom plate 110, so that the distance between the middle of the axle 300 and the bottom plate 110 is increased, thereby allowing the axle 300 to have a larger rotation space in the accommodating space. In some embodiments, the pivot shaft 200 may be rotatably connected to the pedestal 100, that is, the pivot shaft 200 is rotatably connected to the side plates 120, thereby reducing the rotation resistance of the axle 300 when rotating relative to the pedestal 100, and further improving the driving stability of the vehicle 1.

Optionally, baffle 230 are provided on the pivot shaft 200, and the baffles 230 are positioned between the axle 300 and the pedestal 100 to prevent friction between the axle 300 and the pedestal 100 when the axle rotates with respect to the pivot shaft 200. Specifically, two baffles 230 are provided, and the axle 300 is sandwiched between the two baffles 230, so that the axle 300 is spaced apart from the two side plates 120. The baffles 230 can also restrict the axial movement of the axle 300 on the pivot shaft 200, so that the axle 300 does not slide on the pivot shaft 200, thereby improving the stability of the connection between the axle 300 and the pivot shaft 200. In this embodiment, the baffles 230 may be configured as retaining rings, the retaining rings being sleeved onto the pivot shaft 200. In some embodiments, the baffles 230 may also be configured as snap rings, the pivot shaft 200 is provided with snap ring grooves, and the snap rings are snap-fitted in the snap ring grooves, so that the axle 300 is limited between the two snap rings. Preferably, the snap rings are in clearance fit with the axle 300 so that the axle 300 can rotate relative to the pivot shaft 200.

Figure 8:
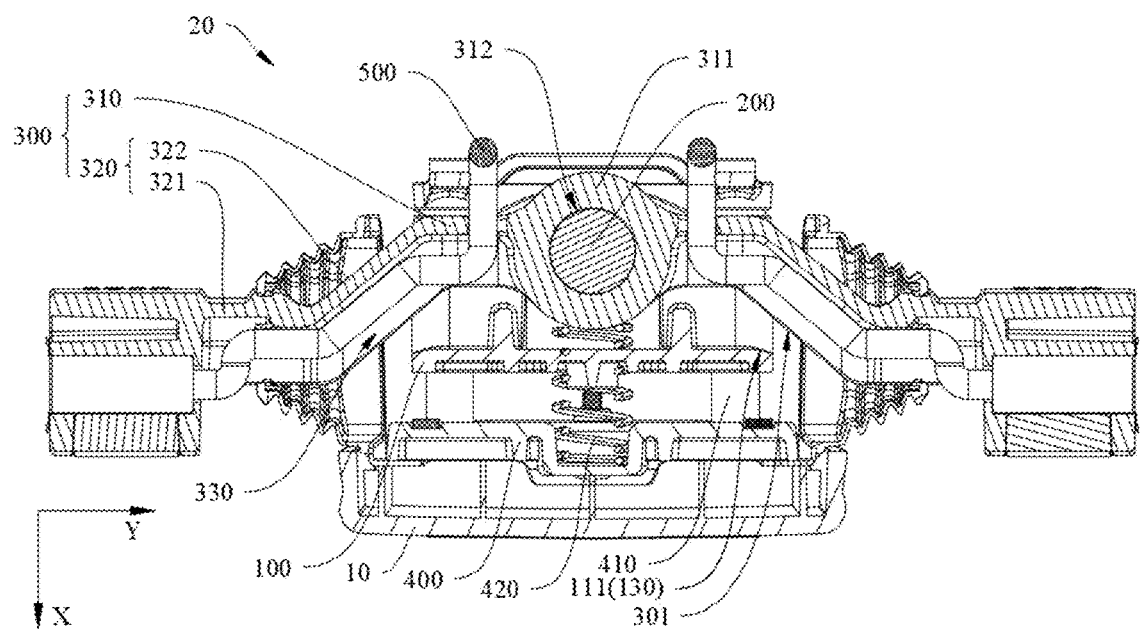
FIG. 8 is a cross-sectional view of an axle structure on the vehicle in FIG. 1 from a second perspective.

Referring to FIGS. 2 and 8, in this embodiment, the axle 300 is configured as a crankshaft structure, and the axle 300 is bent outward at a position thereon corresponding to the pedestal 100 to form an arched structure. A middle of the axle 300 is bent in a direction away from the ground to form the arched structure. A middle raised section of the arched structure is arranged away from the ground with respect to the two ends of the axle 300. When the vehicle 1 is normally placed on the ground, the axle 300 is substantially in a shape like the Chinese character "几". In this embodiment, the axle 300 is configured as an arched structure, such that the middle of the axle 300 has a larger ground clearance relative to the two ends of the axle 300, and thus the chassis 10 has a larger ground clearance, i.e., the height of the chassis of the vehicle 1 is higher, thereby improving the off-road capability of the vehicle 1 and the driving ability under complex road conditions. Of course, in some embodiments, the axle 300 may also be configured as a straight shaft.

Specifically, the axle 300 includes a first subsection 310 and two second subsections 320 connected to two ends of the first subsection 310. The first subsection 310 is rotatably connected to the pivot shaft 200. One end of the second subsection 320 away from the first subsection 310 is connected to a wheel. Each second subsection 320 is bent relative to the first subsection 310. In this embodiment, the axle 300 is arranged on a side of the chassis 10 facing away from the ground. The second subsection 320 includes a flat section 321 and a bent section 322 connected between the flat section 321 and the first subsection 310. The flat section 321 is located on a side of the first subsection 310 that faces the ground. An extension direction of the flat section 321 and an extension direction of the first subsection 310 are parallel to the chassis 10. The bent section 322 is bent toward a side facing away from the ground relative to the flat section 321 and is connected to the first subsection 310. A bending angle of the bent section 322 relative to the flat section 321 may be specifically set according to actual needs of the vehicle 1. The bending angle refers to an acute angle formed between the extension direction of the flat section 321 and an extension direction of the bent section 322. When the length of the bent section 322 is a constant value, the larger the bending angle is, the farther the distance between the flat section 321 and the first subsection 310 in a direction perpendicular to the ground is, the greater the ground clearance of the chassis 10 is. A surface of a side of the bent section 322 facing the bottom plate 110 may be configured as an abutment surface 301.

When the vehicle 1 is normally placed on the ground, the extension direction of the first subsection 310 and the extension direction of the flat section 321 are substantially parallel to the ground, and the extension direction of the bent section 322 is angled relative to the ground. The first subsection 310 is located on a side of the flat section 321 facing away from the ground. As such, the bent section 322 may increase the ground clearance of the chassis 10. In some embodiments, the axle 300 may also be configured in a circular arc structure, a curved structure, or other forms of arched structures such that the middle of the axle 300 may be away from the ground with respect to the two ends of the axle 300.

Figure 9:
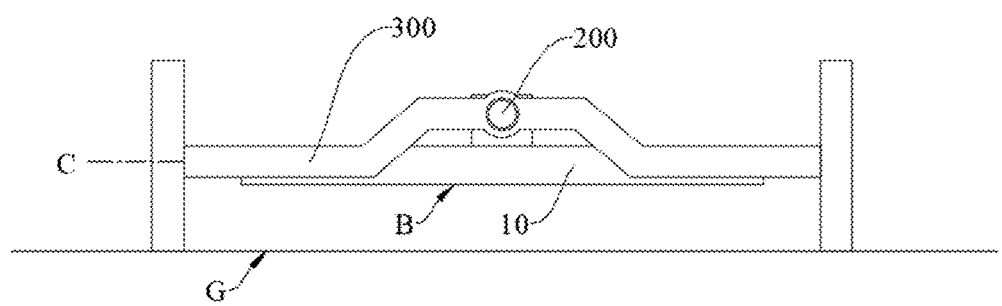
FIG. 9 is a schematic diagram of a vehicle in a fourth driving state according to an embodiment of the present disclosure.

Referring to FIG. 9, a dashed line C in FIG. 9 represents a central axis of the wheel. The obstacle-traversing ability of the vehicle 1 is related to a diameter of the wheel and the ground clearance of the chassis 10. The higher the ground clearance of the chassis 10, the greater the height of obstacles that the vehicle 1 can traverse, and the better the off-road capability of the vehicle 1. In this embodiment, when the vehicle 1 is normally placed on the ground, a central axis C of the wheel is located on a side of the bottom surface B facing away from the ground. The ground clearance of the chassis 10 is related to the diameter of the wheel and the distance between the bottom surface B and the central axis C. The greater the diameter of the wheel, the smaller the distance between the bottom surface B and the central axis C, the greater the ground clearance of the chassis 10. The larger the diameter of the wheel, the larger the overall size of the vehicle 1. Therefore, an increase in the ground clearance of the chassis 10 by increasing the diameter of the wheel will impede the miniaturization design of the vehicle 1. In this embodiment, by configuring the axle 300 as an arched structure, the distance between the bottom surface B and the central axis C can be reduced, so that the ground clearance of the chassis 10 is increased, thereby improving the off-road capability of the vehicle 1. It should be noted that, in some embodiments, when the vehicle 1 is normally placed on the ground, the central axis C of the wheel is located on a side of the bottom surface B close to the ground. At this time, the greater the distance between the bottom surface B and the central axis C, the greater the ground clearance of the chassis 10.

A connection hole 312 for connecting to the pivot shaft 200 is formed in the first subsection 310, and the pivot shaft 200 penetrates through the connection hole 312. It should be understood that, after the first subsection 310 is provided with the connection hole 312, the structural strength of the first subsection 310 around the connection hole 312 may be significantly reduced, and when the axle 300 is subjected to vibration or impact, breakage is likely to occur in the proximity of the connection hole 312. Optionally, in this embodiment, a reinforcing structure 311 for reinforcing the structural strength of a connection between the axle 300 and the pivot shaft 200 is provided in the middle of the axle 300, and the thickness of the reinforcing structure 311 in the middle is greater than the thickness thereof at the two ends.

Specifically, in this embodiment, the reinforcing structure 311 is configured as a cylindrical structure, and an axial direction of the cylindrical structure is perpendicular to an extension direction of the axle 300. The shape of a cross section of the cylindrical structure is substantially circular, and a center hole of the cylindrical structure is configured as the connection hole 312. In a view angle as shown in FIG. 8, the cylindrical structure has a first thickness in a first direction X, and the first subsection 310 has a second thickness in the first direction X other than at the location of the cylindrical structure, the first thickness being greater than the second thickness. In a second direction Y, the thickness of the cylindrical structure in the middle is greater than the thickness thereof at the two ends. The first direction X refers to a direction perpendicular to the chassis 10, and the second direction Y refers to a direction parallel to the chassis 10. In a circumferential direction of the cylindrical structure, wall thicknesses at various positions of the cylindrical structure are substantially equal, so that the first subsection 310 has sufficient structural strength at the connection hole 312, thereby solving the problem that breakage easily occurs in the proximity of the connection hole 312.

In some embodiments, a cross section of the reinforcing structure 311 may be configured as a spindle shape, a minor axis of the spindle-shaped structure is parallel to the first direction X, a major axis thereof is parallel to the second direction Y, and the connection hole 312 is formed in a middle position of the spindle-shaped structure. In some embodiments, the reinforcing structure 311 may also be configured as a reinforcing rib provided near the connection hole 312 on the first subsection 310, and the reinforcing rib may be provided along the extension direction of the axle 300.

In this embodiment, the vehicle 1 further includes a base 400 and guide posts 410 arranged on the base 400. Preferably, a plurality of guide posts 410 are provided. The pedestal 100 is slidably connected to the guide posts 410, and the pedestal 100 can slide along the guide posts 410 to be away from or close to the base 400. The pedestal 100 has a first position and a second position with respect to the base 400. In the first position, the pedestal 100 is relatively close to the base 400, and in the second position, the pedestal 100 is relatively far away from the base 400. When the vehicle 1 is normally placed on the ground, the vehicle body will move close to the ground with respect to the axle 300 under the action of gravity, and at this time, the pedestal 100 slides to the second position along the guide posts 410. When the vehicle 1 is lifted and separated from the ground, the axle 300 may move with respect to the vehicle body in a direction close to the ground under the action of gravity, and at this time, the pedestal 100 slides to the first position along the guide posts 410. Preferably, a buffer member 420 is provided between the pedestal 100 and the base 400. The buffer member 420 is configured to provide a damping force for the pedestal 100 when the pedestal 100 slides along the guide posts 410, slowing down a sliding speed of the pedestal 100 to avoid a large impact with the base 400 when the pedestal 100 moves to the first position or the second position. At the same time, the buffer member 420 may also be configured to absorb a part of impact force of the ground on the vehicle 1 when the vehicle 1 drives over uneven ground, thereby improving the smoothness of the vehicle 1 during the driving process.

In this embodiment, an accommodating cavity 330 is provided in the axle 300, and cables 500 for connecting drive motors on the vehicle 1 are routed through the accommodating cavity 330. The accommodating cavity 330 is formed along the extension direction of the axle 300. The first subsection 310 is provided with holes through which the cables 500 pass, and the cables 500 enter through the holes and exit from the ends of the axle 300. Preferably, the drive motors are configured as hub motors, and the hub motors are mounted on the wheels. The cables 500 are configured to connect the hub motors to components such as a power supply and a controller on the vehicle body. In this embodiment, by accommodating the cables 500 in the accommodating cavity 330, the cables 500 can be neatly stored, and the axle 300 can also protect for the cables 500 to prevent the cables 500 from being worn.

The foregoing descriptions are merely some of the embodiments of the present disclosure, but are not intended to limit the scope of protection of the present disclosure. Any variation or replacement readily figured out by a person skilled in the art within the technical scope disclosed in the present disclosure shall fall within the scope of protection of the present disclosure. Therefore, the scope of protection of the present disclosure shall be subject to the scope of protection of the claims.

The invention claimed is:

1. An axle structure, comprising:
a pedestal;
a pivot shaft, disposed on the pedestal; and
an axle, wherein a middle of the axle is rotatably connected to the pivot shaft, allowing two ends of the axle to rotate vertically relative to the pedestal;
wherein the pivot shaft comprises an intermediate section and connecting sections connected to two ends of the intermediate section, a diameter of the intermediate section is greater than a diameter of the connecting section, and the middle of the axle is rotatably connected to the intermediate section.

2. The axle structure according to claim 1, wherein the limiting structures are provided on the pedestal, and the limiting structures are configured to limit a rotating angle of the axle.

3. The axle structure according to claim 2, wherein the limiting structures are configured as a chamfer structures disposed on the pedestal, and the axle comprises abutment surfaces mating with the chamfer structures.

4. The axle structure according to claim 1, wherein the pedestal comprises a bottom plate and two side plates connected to the bottom plate, the two side plates are disposed opposite each other, and the pivot shaft is located between the two side plates; and
mounting grooves are formed on sides of the side plates facing away from the bottom plate, the pivot shaft is positioned in the mounting grooves, and the pivot shaft is connected to the side plates via fasteners.

5. The axle structure according to claim 1, wherein the axle is bent outward at a position thereon corresponding to the pedestal to form an arched structure.

6. The axle structure according to claim 1, wherein the axle comprises a first subsection and two second subsections connected to two ends of the first subsection; the first subsection is rotatably connected to the pivot shaft; and each of the second subsections is bent relative to the first subsection.

7. The axle structure according to claim 1, wherein a reinforcing structure is provided in the middle of the axle, the thickness of the middle of the reinforcing structure is greater than that at two ends thereof, and a connection hole for connecting to the pivot shaft is formed in the reinforcing structure.

8. The axle structure according to claim 1, wherein baffle are provided on the pivot shaft, and the baffle are located between the axle and the pedestal.

9. The axle structure according to claim 1, further comprising a base, wherein guide posts are provided on the base, the pedestal is slidably connected to the guide posts, and a buffer member is provided between the base and the pedestal.

10. The axle structure according to claim 1, wherein an accommodating cavity is provided in the axle, and cables for connecting to drive motors of a vehicle are routed through the accommodating cavity.

11. A vehicle, comprising an axle structure, a chassis, the axle structure is arranged on the chassis comprising an axle structure, the axle structure comprises a pedestal; a pivot shaft, disposed on the pedestal; and an axle, wherein a middle of the axle is rotatably connected to the pivot shaft, allowing two ends of the axle to rotate vertically relative to the pedestal; wherein the pivot shaft comprises an intermediate section and connecting sections connected to two ends of the intermediate section, a diameter of the intermediate section is greater than a diameter of the connecting section, and the middle of the axle is rotatably connected to the intermediate section.

12. The vehicle according to claim 11, wherein the limiting structures are provided on the pedestal, and the limiting structures are configured to limit a rotating angle of the axle.

13. The vehicle according to claim 12, wherein the limiting structures are configured as a chamfer structures disposed on the pedestal, and the axle comprises abutment surfaces mating with the chamfer structures.

14. The vehicle according to claim 11, wherein the pedestal comprises a bottom plate and two side plates connected to the bottom plate, the two side plates are disposed opposite each other, and the pivot shaft is located between the two side plates; and
mounting grooves are formed on sides of the side plates facing away from the bottom plate, the pivot shaft is positioned in the mounting grooves, and the pivot shaft is connected to the side plates via fasteners.

15. The vehicle according to claim 11, wherein the axle is bent outward at a position thereon corresponding to the pedestal to form an arched structure.

16. The vehicle according to claim 11, wherein the axle comprises a first subsection and two second subsections connected to two ends of the first subsection; the first subsection is rotatably connected to the pivot shaft; and each of the second subsections is bent relative to the first subsection.

17. The vehicle according to claim 11, wherein a reinforcing structure is provided in the middle of the axle, the thickness of the middle of the reinforcing structure is greater than that at two ends thereof, and a connection hole for connecting to the pivot shaft is formed in the reinforcing structure.

18. The vehicle according to claim 11, wherein baffle are provided on the pivot shaft, and the baffle are located between the axle and the pedestal.

19. The vehicle according to claim 11, further comprising a base, wherein guide posts are provided on the base, the pedestal is slidably connected to the guide posts, and a buffer member is provided between the base and the pedestal.

20. The vehicle according to claim 11, wherein an accommodating cavity is provided in the axle, and cables for connecting to drive motors of a vehicle are routed through the accommodating cavity.

* * * * *